Oct. 17, 1961 R. L. SCHINNERER 3,004,806
LUBRICATION SYSTEM FOR HIGH SPEED MACHINES
Filed Sept. 21, 1955 2 Sheets-Sheet 1

ROY L. SCHINNERER,
INVENTOR.

BY John H.J. Wallace

Oct. 17, 1961   R. L. SCHINNERER   3,004,806
LUBRICATION SYSTEM FOR HIGH SPEED MACHINES
Filed Sept. 21, 1955                                2 Sheets-Sheet 2
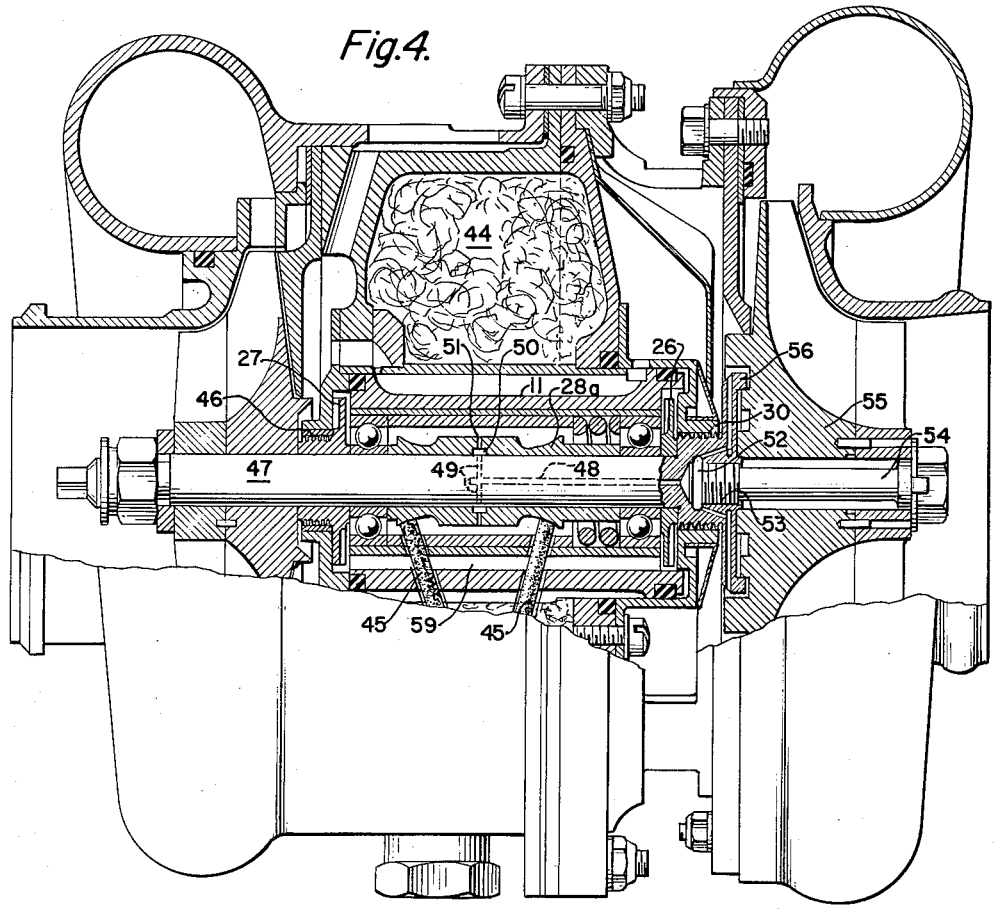
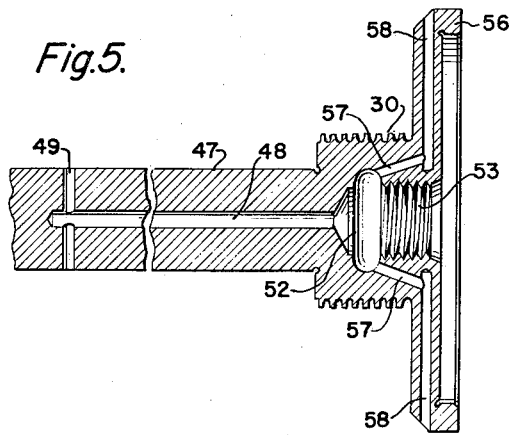
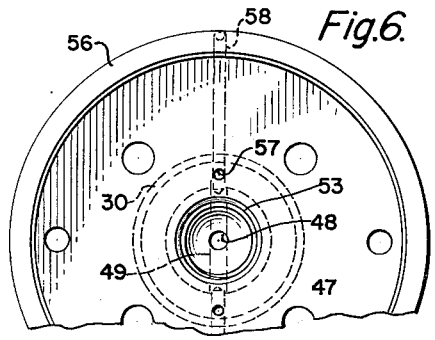
ROY L. SCHINNERER,
INVENTOR.
BY John H. Wallace

United States Patent Office 3,004,806
Patented Oct. 17, 1961

3,004,806
LUBRICATION SYSTEM FOR HIGH SPEED MACHINES
Roy L. Schinnerer, Long Beach, Calif., assignor to The Garrett Corporation, Los Angeles, Calif., a corporation of California
Filed Sept. 21, 1955, Ser. No. 535,643
10 Claims. (Cl. 308—187)

The present invention relates generally to lubrication systems for high speed machines. More particularly, it is concerned with lubrication systems which find utility in fluid circulating units of the lightweight, high velocity turbine driven type, generally used in aircraft and vehicular air conditioning and refrigeration systems.

The increased demand for higher capacity air conditioning and refrigeration units in modern aircraft, coupled with a strong prohibition against any increase in weight and size, has necessitated the development of high velocity turbine and fan combinations which operate at speeds greatly in excess of the already very high speeds used in similar units in the early development stages. These higher speeds of operation, of the order of 115,000 r.p.m. and more, have much refinement of design and greatly improved lubrication for the shaft bearings.

In order to lubricate the main bearing surfaces efficiently and effectively in all attitudes of the aircraft and to supply the maximum amount of lubricating oil to the bearings, it has been found desirable to pack oil sumps in such units with oil absorbent material. The presence of such packing allows a greater amount of oil to be carried in the oil sump. This additional oil is absorbed into the oil pack and thus is prevented generally from running out in large amounts through the bearings or other necessary clearances.

Modern practice provides that the oil shall be fed by wicks or otherwise conveyed to the rotating shaft from which the oil is discharged or thrown through the bearings in the form of an oil mist. Despite all attempts to provide efficient shaft sealing means, this oil mist tends to escape from the bearing carrier and is dissipated into the turbine or fan discharges. The presence of oil vapor in either of these discharges is highly undesirable and is untenable. Also, such loss of oil or lubricating fluid may seriously affect the bearings and adversely curtails the operating period.

In the prior art, much thought and effort has been expended to minimize such oil loss. One suggested method was to pressurize the spaces outward of the bearings by introducing bleed air or fluid from either the turbine inlet or the fan discharge. Such measures were only partly effective, however, and the use of such higher pressures sometimes resulted in preventing the oil mist from proceeding through the bearings, to their detriment.

The principal object of this invention, therefore, is to provide an improved means of conserving the lubricating fluid and preventing its loss.

Another object of this invention is to lengthen the periods between required overhaul and replenishment of the lubricating system by providing means to prevent the loss of the lubricating fluid.

A further object of this invention is to improve and promote better circulation of lubricating fluid through the bearings of such turbine driven fluid circulating units.

Further objects and advantages of the invention will be brought out in the following specification wherein a detailed description of the invention is given for the purpose of disclosing two embodiments thereof without limiting its scope.

Referring to the drawings which are for illustrative purposes only and wherein like reference characters denote like parts:

FIGURE 4 is a sectional longitudinal view of another form of turbine driven fluid circulating unit embodying a modified form of the invention;

FIGURE 5 is a sectional view of the shaft shown in FIGURE 4;

FIGURE 6 is an end view of the shaft shown in FIGURE 5.

Figure 1:
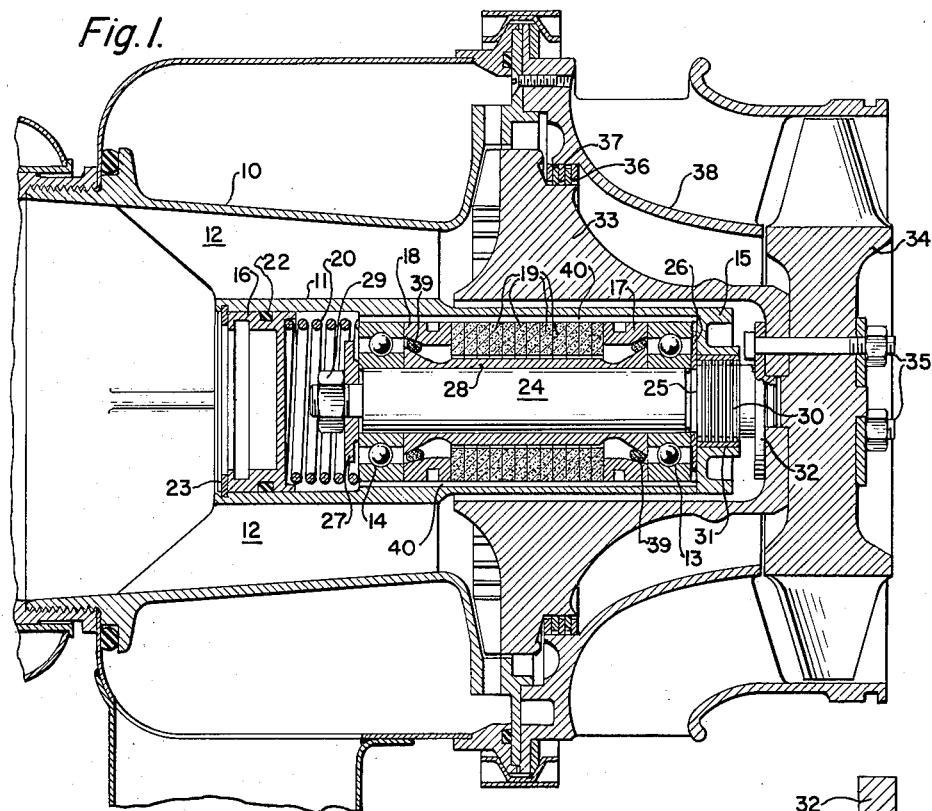
FIGURE 1 is a longitudinal sectional view of one form of a turbine driven fluid circulating unit embodying the invention.
Figure 2:
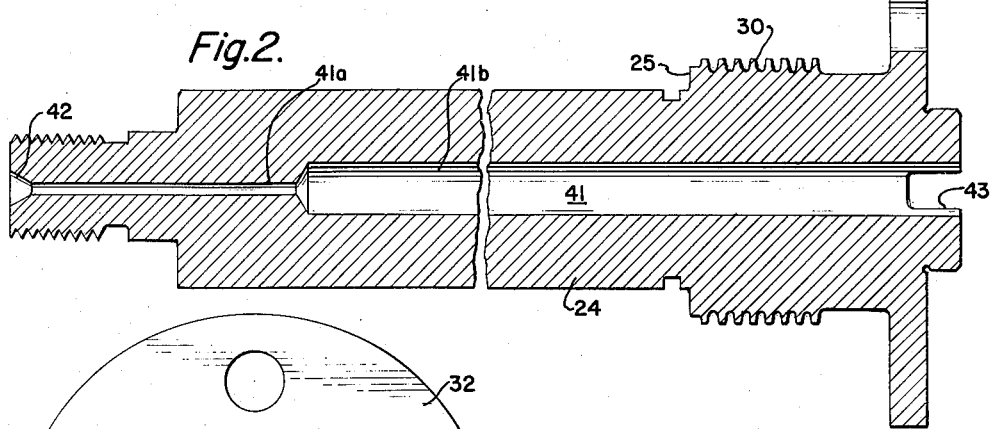
FIGURE 2 is a sectional view of the main shaft of the unit shown in FIGURE 1.

With reference to FIGURES 1 and 2, the generally cylindrical turbine shroud is shown at 10. The bearing carrier 11 is mounted concentrically to the turbine shroud 10 by means of vanes or struts 12. These latter parts are brazed or otherwise secured to and between the turbine shroud 10 and bearing carrier 11.

Bearing carrier 11 encases two shaft bearings 13 and 14 which are held in place by end plugs 15 and 16, wick retainers 17 and 18, oil retaining washers 19, and preloading compression spring 20. End plug 15 may be brazed or otherwise secured in the fan end of the bearing carrier 11. End plug 16 carries a sealing member 22 and is removably secured in the opposite end of carrier 11 by means of a snap ring 23.

Shaft bearings 13 and 14 support shaft 24 which is secured therein by shoulder 25, oil slingers 26 and 27, a spacer 28, ramped at each end, and a nut 29. The enlarged portion of the shaft 24, extending from the shoulder 25, bears a labyrinth type sealing member 30 which co-operates with the sleeve-like sealing member 31 affixed in the bore of end plug 15. Shaft 24 terminates in a flange 32 bearing the bell-shaped turbine wheel 33 and axial fan 34. These latter parts are affixed to the flange 32 by means of a plurality of bolts 35.

Turbine wheel 33 bears a cylindrical back sealing member 36 which co-operates with a sealing member 37 installed in the interior of fan inlet housing 38. This sealing arrangement prevents the hot and high pressure turbine entry air from escaping over the back of the turbine wheel and into the fan passages.

As can be seen from FIGURE 1, the lubrication system provided in this embodiment is wholly enclosed within the bearing carrier 11 and comprises a series of oil absorbent washers 19, wicks 39, wick retainers 17 and 18, ramped spacer 28, and slingers 26 and 27. Wicks 39 feed oil from washers 19 to the ramps of spacer 28. Under the influence of centrifugal force, the oil is then thrown off the ramps into and through the main bearings in the form of a mist. Slingers 26 and 27 then tend to throw the oil outwardly and act to return the oil through the longitudinal grooves 40, which are machined into the internal surface of bearing carrier 11, back to the oil sump washers 19.

While this system of oil mist circulation works well, there is a certain amount that seeps through the labyrinth seal 30—31. Obviously, the operation of these high speed devices is dependent on the life of the bearings which, in turn, is a function of constant and efficient lubrication. Any means which will prevent the escape of oil or oil mist enhances such constant and efficient lubrication and considerably increases the period of operation before replacement or replenishment of the lubricating fluid is required.

Figure 3:
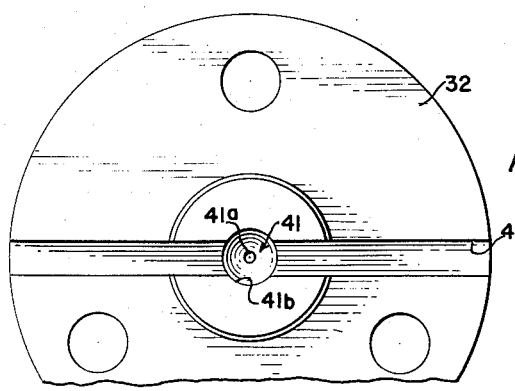
FIGURE 3 is an end view of the shaft shown in FIGURE 2.

My invention, therefore, provides such preventive means. As can be seen in FIGURES 2 and 3, shaft 24 is provided with a concentric axial bore 41 which terminates at one end in a coned central cavity 42 and at the other end in a diametral slot 43 which is machined across the outward face of flange 32. The difference in diameters between portions 41a and 41b of the bore 41 is of no great significance. Portion 41a must be small enough, depending on the size of the shaft, to permit the machining of a relatively large conical cavity 42. Portion 41b may be made larger in diameter for the purpose of reducing weight.

With reference to FIGURE 1, the cavity end of shaft 24 extends into the closed left portion of bearing carrier 11. Flange 32 with its diametral slot 43 extends outside of the bearing carrier 11. The ends of this slot open into the interior of the bell shaped hub of the turbine wheel 33. While the insulating blanket of air or power fluid is more or less static, its pressure head will be somewhat greater than atmospheric. At the high speeds experienced by the rotating assembly, the diametral slot 43 acts as a pump to exhaust the interior of the bearing carrier, thereby materially lowering the pressure of the oil mist and air contained therein. This lowering of the pressure inside the bearing carrier correspondingly increases the pressure differential across the seal which, in turn, prevents the escape of oil therethrough. Cavity 42 acts to collect the oil from the oil mist and to throw it outwardly by centrifugal force. Thus, by this separating action, only air is pulled through bore 41 and exhausted from the bearing carrier by the pumping action of the flange 32 and its diametral slot 43.

The embodiment shown in FIGURES 4-6 discloses the application of my invention to a different type of turbine driven fluid circulating unit. Here the absorbent material packed oil sump 44 is external to the bearing carrier 11. Wicks 45 carry the lubricating fluid to the ramps of spacer 28a and the oil mist circulation is then similar to that described above with the exception that there are now two seals 30 and 46 to provide oil leakage. As shown, both of these seals are externally exposed to ambient atmospheric pressure.

In order to provide the air pumping means to partially evacuate the bearing carrier chamber enclosed by the seals, shaft 47 is partially pierced with a concentric axial bore 48 and has a radial diametral bore 49 intersecting and joining with the axial bore 48. Spacer 28a is provided with an internal annular groove 50 which overlies the ends of the diametral bore 49. Spacer 28a is additionally provided with a plurality of radial holes 51 which open into the annular groove 50. Axial bore 48 terminates in a chamber 52 and a threaded bore 53. This latter bore receives the quill 54 which is utilized to secure the impeller wheel 55 to the enlarged and flanged end 56 of the shaft 47. Two passages 57 extend outwardly from chamber 52 and intersect two radial passages 58 which are formed in the flange 56.

The operation of my invention as employed in this embodiment may now be explained. The oil mist thrown off by the ramps of spacer 28a circulates through the main bearings. The slingers 26 and 27 aid in this circulation by drawing the oil mist through the bearings and then slinging it off by centrifugal force. The coalesced oil drains back to the wicks through passage 59. The radial passages 58 in the flange 56 act, under the high speed of rotation, as a centrifugal pump to draw air from the interior of the bearing carrier 11 through the holes 51, groove 50, diametral bore 49, axial bore 48, chamber 52, and passages 57.

As diametral bore 49 and its associated groove 50 and radial holes 51 are all rotating at high speeds, oil is thrown off by centrifugal force and only air will pass inwardly as previously described. Since the interior of bearing carrier 11 is thus partially evacuated and the area outside of the seals is under atmospheric pressure, no oil will leak through the seals.

While I have described my invention in connection with small, high-speed, high capacity turbine driven fluid circulating units, I wish to assert that my invention may be used wherever a lubricated high-speed shaft is supported by bearings which, in turn, are enclosed in a sealed bearing carrier.

Having thus described my invention, I claim:

1. In high speed rotating machinery: a sealed bearing carrier; a shaft and rotating assembly affixed thereto supported by said sealed bearing carrier; means for supplying a lubricant mist to the bearings contained within said sealed bearing carrier; pumping means integrally formed on said shaft for evacuating the interior of said sealed bearing means; and means formed in said shaft for separating lubricant from the vapor being evacuated.

2. In high speed rotating machinery: a sealed bearing carrier exposed to at least ambient atmospheric pressure externally of said seals; a shaft and rotating assembly affixed thereto supported by said sealed bearing carrier; means for supplying a lubricating mist to the bearings contained within said sealed bearing carrier; means formed in said shaft for separating lubricant from the vapor contained within said sealed bearing carrier; and pumping means integrally formed on said shaft externally of said seals for evacuating the interior of said sealed bearing carrier to less than ambient atmospheric pressure whereby said lubricant and lubricant mist are prevented from escaping through said seals.

3. In high speed rotating machinery: a sealed bearing carrier; a shaft and rotating assembly affixed thereto supported by said sealed bearing carrier; means for supplying a lubricant and lubricant mist to the bearings contained within said sealed bearing carrier; said sealed bearing carrier being exposed to a first fluid pressure external thereof; means formed in said shaft for separating lubricant from the fluid contained within said sealed bearing carrier, said fluid being at a second pressure; and pumping means integrally formed on said shaft externally of said seals for reducing said second pressure below said first pressure whereby said lubricant and lubricant mist are prevented from being dissipated through said seals.

4. In high speed rotating machinery: a sealed bearing carrier; a plurality of bearings supported in said sealed bearing carrier; a shaft and a rotating assembly affixed to said shaft, the shaft being supported by said bearings; lubricating means contained wholly within said bearing carrier for supplying a lubricating mist to said bearings; and means associated with said shaft for evacuating the interior of said sealed bearing carrier.

5. In high speed rotating machinery: a sealed bearing carrier; a plurality of bearings supported in said sealed bearing carrier; a shaft and a rotating assembly affixed to said shaft, the shaft being supported by said bearings; lubricating means contained wholly within said bearing carrier for supplying a lubricating mist to said bearings; and pumping means associated with said shaft for evacuating the interior of said sealed bearing carrier.

6. In high speed rotating machinery: a sealed bearing carrier; a plurality of bearings supported in said sealed bearing carrier; a shaft and a rotating assembly affixed to said shaft, the shaft being supported by said bearings; lubricating means contained wholly within said bearing carrier for supplying a lubricating mist to said bearings; pumping means associated with said shaft for evacuating the interior of said sealed bearing carrier; and means carried by said shaft to separate lubricant in the lubricant mist from the vapor being evacuated.

7. In high speed rotating machinery: a casing; a plurality of bearings supported in said casing; a shaft disposed for rotation in said bearings and extending through said casing; lubricating means for said bearings; sealing means for said shaft fixed in said casing between the ambient atmosphere and the bearings; a passage in said shaft extending from and communicating with the interior of said casing and extending axially beyond said sealing means; and centrifugal pumping means actuated by the rotation of the shaft and connected to the passage in the shaft outwardly of said sealing means for reducing the air pressure in the casing below that of the ambient atmosphere.

8. In high speed rotating machinery: a casing; a plurality of bearings supported in said casing; a shaft disposed for rotation in said bearings and extending through said casing; lubricating means for said bearings; sealing means for said shaft fixed in said casing between the ambient atmosphere and the bearings; a passage in said shaft extending from and communicating with the interior of said casing and extending axially beyond said sealing means; centrifugal pumping means actuated by the rotation of the shaft and connected to the passage in the shaft outwardly of said sealing means for reducing the air pressure in the casing below that of the ambient atmosphere; and centrifugal means actuated by the rotation of said shaft for removing lubricant from the air drawn from said casing by said centrifugal pumping means.

9. In high speed rotating machinery: a casing; a plurality of bearings supported in said casing; a shaft disposed for rotation in said bearings and extending through said casing; lubricating means for said bearings; sealing means for said shaft fixed in said casing between the ambient atmosphere and the bearings; a passage in said shaft extending from and communicating with the interior of said casing and extending axially beyond said sealing means; and generally radially extending passage means actuated by the rotation of the shaft and having the radially inner end thereof connected to the passage in the shaft for reducing the air pressure in the casing below that of the ambient atmosphere.

10. In high speed rotating machinery: a casing; a plurality of bearings supported in said casing; a shaft disposed for rotation in said bearings and extending through said casing; lubricating means responsive to the rotation of said shaft to create a lubricant mist and circulate the same around said bearings; sealing means for said shaft fixed in said casing between the ambient atmosphere and the bearings; a passage in said shaft extending from and communicating with the interior of said casing and extending axially beyond said sealing means; and generally radially extending passage means actuated by the rotation of the shaft and having the radially inner end thereof connected to the passage in the shaft for reducing the air pressure in the casing below that of the ambient atmosphere.

References Cited in the file of this patent

UNITED STATES PATENTS

| | | |
|---|---|---|
| 2,234,777 | Puffer | Mar. 11, 1941 |
| 2,492,672 | Wood | Dec. 27, 1949 |
| 2,702,093 | Sherrill | Feb. 15, 1955 |
| 2,709,567 | Wood | May 31, 1955 |